(12) United States Patent
Andersen et al.

(10) Patent No.: US 6,299,726 B1
(45) Date of Patent: Oct. 9, 2001

(54) METHOD FOR MAKING PAPER NUGGETS FROM WASTE PAPER

(76) Inventors: Erling Reidar Andersen, Haugeveien 15, 1621 Gressvik (NO); Erling Jim Andersen, P.O. Box 743, New Denmark, New Brunswick (CA), E7G 4H3

( * ) Notice: Subject to any disclaimer, the term of this patent is extended or adjusted under 35 U.S.C. 154(b) by 0 days.

(21) Appl. No.: 09/504,804

(22) Filed: Feb. 16, 2000

(30) Foreign Application Priority Data

Feb. 17, 1999 (CA) .................................................. 2262213

(51) Int. Cl.[7] .................................................. D21H 11/14
(52) U.S. Cl. .................................. 162/4; 264/914; 264/918; 241/27; 241/24.13; 241/24.19; 241/22.1; 425/222
(58) Field of Search .......................... 162/4, 100; 8/156; 428/98; 425/222, 461, DIG. 49; 241/24.13, 24.19, 27, 221; 264/914, 918

(56) References Cited

U.S. PATENT DOCUMENTS

| | | |
|---|---|---|
| Re. 24,003 | 5/1955 | Ericks et al. .......................... 117/140 |
| 1,259,502 | 3/1918 | Farr .......................................... 106/93 |
| 1,463,123 | 7/1923 | McAllister .............................. 106/76 |
| 1,631,171 | 6/1927 | Weiss . |
| 2,294,932 | 9/1942 | Page .......................................... 83/94 |
| 2,301,597 | 11/1942 | Welty et al. ............................. 106/93 |
| 2,519,384 | 7/1950 | Hill et al. .................................. 92/20 |
| 3,105,491 | 10/1963 | Harwood ............................... 128/290 |
| 3,705,837 | 12/1972 | Breslauer ............................... 161/168 |
| 3,940,466 | 2/1976 | Evers et al. ........................... 264/45.3 |
| 4,123,489 | 10/1978 | Kelley .................................... 264/141 |
| 4,402,751 | 9/1983 | Wilde ...................................... 106/93 |
| 4,428,844 | 1/1984 | Wagener .......................... 252/8.5 LC |
| 5,102,596 | 4/1992 | Lempfer et al. ...................... 264/115 |
| 5,134,023 | 7/1992 | Hsu ...................................... 428/288 |
| 5,196,061 | 3/1993 | Thomas et al. ....................... 106/697 |
| 5,230,943 | 7/1993 | Pregont ................................. 428/156 |
| 5,241,795 | 9/1993 | Giroux et al. .................... 52/DIG. 9 |
| 5,277,572 | 1/1994 | Trent et al. ............................ 425/331 |
| 5,344,595 | 9/1994 | Aoki et al. .............................. 264/26 |
| 5,350,451 | 9/1994 | Patterson ............................. 106/805 |
| 5,392,721 | 2/1995 | Judd ..................................... 110/346 |
| 5,614,458 | * 3/1997 | Webb et al. .......................... 502/401 |
| 5,643,359 | 7/1997 | Soroushian et al. ................. 106/805 |
| 5,785,419 | 7/1998 | McKelvey ................................ 366/6 |

FOREIGN PATENT DOCUMENTS

WO 97/15184   5/1997   (WO) .
WO 98/43805   10/1998  (WO) .

* cited by examiner

*Primary Examiner*—Dean T. Nguyen
(74) *Attorney, Agent, or Firm*—Mario Theriault

(57) ABSTRACT

There is provided a stock of paper nuggets for manufacturing composite building materials, wherein the stock of paper nuggets comprises a large portion of paper nuggets each having a thick mass, a twisted core and a tailed configuration. This stock of paper nuggets is advantageous for being composed of cohesive entities which can be manipulated on a construction site or sold to the public in bags, for use in backyard projects. The paper nuggets have good mold-filling and interlacing properties for manufacturing paper-based products having a homogenous structure and good mechanical properties. There are also provided a method and apparatus using one or more spherical rotors for penetrating a wet paper mulch, for pulling paper nuggets out of this wet paper mulch and for imparting in these paper nuggets their interlacing properties.

6 Claims, 3 Drawing Sheets

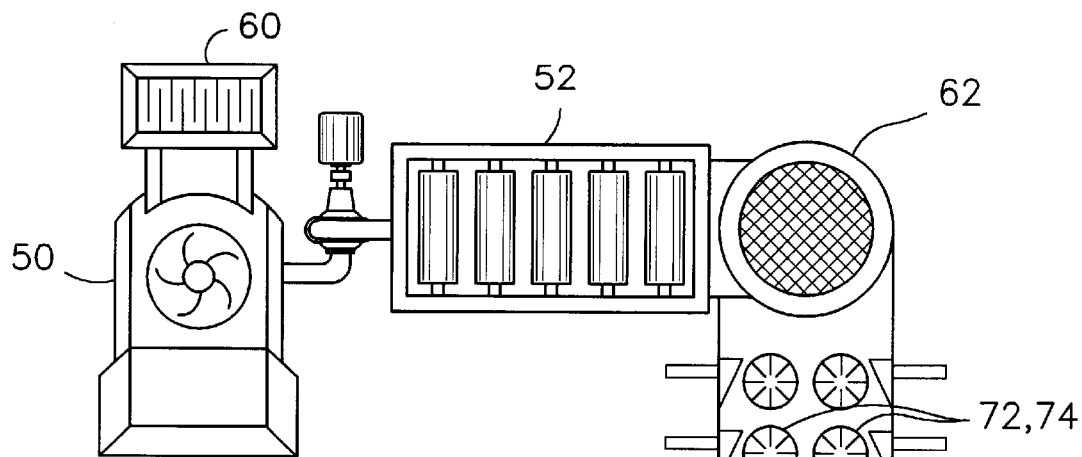
FIG. 6
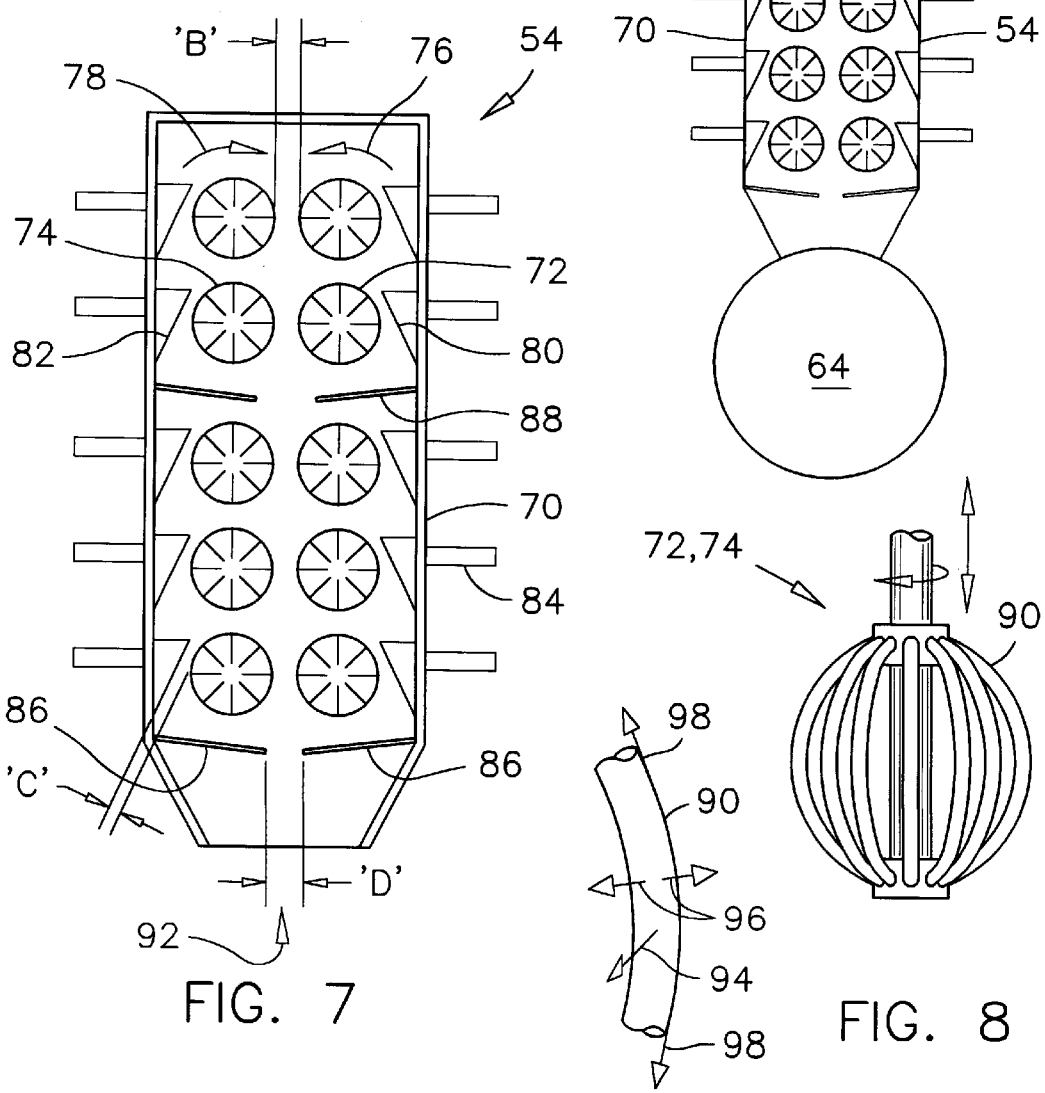
FIG. 7
FIG. 8
FIG. 9

METHOD FOR MAKING PAPER NUGGETS FROM WASTE PAPER

FIELD OF THE INVENTION

This invention pertains to paper nuggets, and particularly to the manufacture of an aggregate stock of paper nuggets having mold-filling abilities and mutual interlacing properties.

BACKGROUND OF THE INVENTION

The enormous amount of waste paper disposed of in landfills has prompted many to explore other more ecological solutions to this reality. As may be appreciated, waste paper, even when made with a high percentage of post-consumer fibres, still contains whole-length wood fibres and can be re-used to manufacture a variety of products. In that regard, several methods and apparatus have been developed in the past for repulping waste paper and for manufacturing numerous useful paper-based products.

As examples of ecological products of the prior art, U.S. Pat. No. 5,230,943 issued on Jul. 27, 1993 to J. E. Pregont, discloses specific hollow flake-like shapes of free-flowing dunnage made from molded pulp and used as packaging material.

U.S. Pat. No. 4,123,489 issued on Oct. 31, 1978 to J. A. Kelly, discloses a method for converting paper materials into more useful forms for uses such as plant mulches, light-weight concrete aggregates, fertilizers, animal feeds and fuels.

PCT International Publication number WO 97/15184 published on May 1, 1997 discloses a method and apparatus for manufacturing paper pellets that are used as pet litter, insulating material and material for absorbing spillage of oil, chemicals and the like.

In another perspective, wood is a preferred building material in the residential and commercial construction industries. Wood is easily cut, chiselled, sanded, drilled and nailed to accommodate almost any shape and application. While wood is considered to be one of the most versatile building material available, concrete is also used in constructions requiring compressive strength, durability and resistance to the elements. In the past, extensive researches have been done, and a number of different composite materials have been developed in an attempt to obtain a single building material having the combined properties of wood and concrete.

In that respect and for ecological reasons as mentioned before, waste paper and other fibrous waste materials have been used and mixed with Portland cement, lime or other binders, to obtain construction blocks, panels and slabs that have good structural strength and heat-insulation properties. These building materials are lightweight, non-flammable and are easily worked with carbide tipped carpentry tools.

The manufacturing of these composite materials requires the mixing and impregnation of shredded paper or other waste fibrous materials with a cement slurry or other liquid binder. The binder-fibre slurry is dried and crumbled into aggregate material. These paper pellets are suitable for storage and for later use in the manufacturing of pre-cast objects such as building blocks, panels, slabs, beams, columns and cast-in-place structures. Such an aggregate stock of paper pellets for use in making building materials is the type of products which is of interest herein.

Examples of the prior art building materials manufactured with aggregate stocks of paper pellets can be found in the following documents:

U.S. Pat. No. 1,463,123, issued on Jul. 24, 1923 to F. J. McAllister;
U.S. Pat. No. 2,301,597 issued on Nov. 10, 1942 to B. E. Welty et al;
U.S. Pat. No. 3,705,837 issued on Dec. 12, 1972 to C. S. Breslauer;
U.S. Pat. No. 4,402,751 issued on Sep. 6, 1983 to B. B. Wilde;
U.S. Pat. No. 5,102,596 issued on Apr. 7, 1992 to K. Lempfer et al;
U.S. Pat. No. 5,134,023 issued on Jul. 28, 1992 to W -H E. Hsu;
U.S. Pat. No. 5,196,061 issued on Mar. 23, 1993 to R. C. Thomas et al;
U.S. Pat. No. 5,241,795 issued on Sep. 7, 1993 to F. A. Giroux et al;
U.S. Pat. No. 5,350,451 issued on Sep. 27, 1994 to E. W. Patterson;
U.S. Pat. No. 5,392,721 issued on Feb. 28, 1995 to W. Judd;
U.S. Pat. No. 5,643,359 issued on Jul. 1, 1997 to P. Soroushian et al;
U.S. Pat. No. 5,785,419 issued on Jul. 28, 1998 to P. A. McKelvey.

It will be appreciated that the strength of a building material made with paper pellets is directly related to the degree of interlacing of the pellets in the finished product. It is also believed that the insulating properties and the light-weight of the building material is directly related to the individual sizes of the pellets used in the manufacturing of this material. Paper pellets having a certain volume, as opposed to individual fibres, entrap air therein, which fact contributes to enhance the heat insulation properties and light weight of the building material made with the pellets.

Although various apparatus and methods were developed in the past to produce paper pellets of various types, it is believed that very little effort has been made to obtain paper pellets that have a substantial volume and a tailed configuration to promote interlacing. As such, it is believed that there continues to be a need in the industry for an aggregate stock of paper pellets or particles that is dust free, that can be stored in heaps, packaged in bags and that has good mold-filling abilities and in which the particles have inter-lacing properties. Furthermore, it is believed that there continues to be a need in the industry for equipment to manufacture such paper pellets without using excessive power.

SUMMARY OF THE INVENTION

In the present invention, there is provided a stock of waste paper nuggets of various shapes and sizes providing good mold-filling abilities. and in which a large percentage of the nuggets have tailed configurations for promoting an inter-lacing of the nuggets there-between and enhancing the mechanical strength of the products manufactured therewith. The stock of nuggets according to the present invention is manufacturable with simple equipment requiring less power than conventional shredders and blade-type comminuting devices.

Broadly, in one aspect of the present invention, there is provided a stock of paper nuggets for manufacturing composite building materials, wherein that stock of paper nuggets comprises a large portion of paper nuggets each having a twisted core, a broad end and a slender tail end. This stock of paper nuggets is advantageous for being composed of cohesive entities which can be manipulated on a construction site as conventional aggregate, or sold to the public in bags for use in backyard projects for examples. Because of the interlacing properties of the paper nuggets this stock can be mixed with a binding agent and set in a mold without specific attention, for nonetheless manufacturing building materials having relatively good mechanical properties.

In accordance with another feature of the present invention, there is provided a method and apparatus for manufacturing an aggregate stock of paper nuggets for use in the manufacturing of composite building materials. This method comprises the steps of:

a) repulping waste paper into a waste paper slurry;
b) dewatering that waste paper slurry for forming a wet mulch of waste paper in which a water content is substantially equivalent to a water absorption capacity of paper fibres in that wet mulch; and
c) simultaneously swirling the wet mulch, extracting fragments from the wet mulch and rolling these fragments against the wet mulch.

This method is known to produce an aggregate stock in which a substantial portion of the mentioned fragments, referred to herein as paper nuggets, have a twisted core and an oblong shape with a broad end and slender tail end.

This method is preferably carried out with one or more spherical rotors each having curved round bars for penetrating the wet mulch. The method can be carried out with a single hand-held rotor and a portable container, for small projects for example, or can be carried out with several rotors suspended in a large trough for commercial production of an aggregate stock.

Still other features of the aggregate stock according to the present invention are that a manufacture thereof reduces the amount of waste paper going to public dumps and landfill. The paper nuggets do not contain binding additive and therefore are susceptible of a low cost of manufacture with regard to both materials and labour, and which accordingly are then susceptible of low prices of sale to the consumer, thereby making such aggregate stock economically available to the public.

BRIEF DESCRIPTION OF THE DRAWINGS

Several examples of paper nuggets found in the aggregate stock according to the present invention, and equipment for manufacturing these nuggets are illustrated in the accompanying drawings in which like numerals denote like parts throughout the several views, and in which:

FIG. 6 illustrates machinery and a preferred process for manufacturing aggregate stock according to the present invention;

FIG. 7 is an enlarged plan view of a preferred nugget-forming apparatus;

FIG. 8 is an enlarged side view of a preferred rotor used in the nugget-forming apparatus;

FIG. 9 is an enlarged side view of a round rod mounted on the preferred rotor, and vectorial representations of the forces imparted to the paper mulch by the preferred rotor during the nugget-forming process.

DETAILED DESCRIPTION OF THE PREFERRED EMBODIMENT

Figure 1:
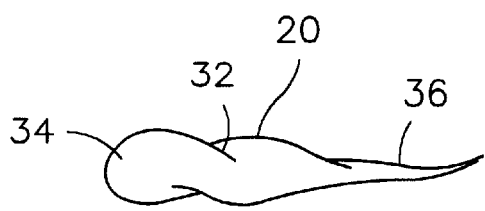
FIG. 1 illustrates an example of tadpole-like waste paper nuggets which constitute the major proportion of the aggregate stock according to the present invention.
Figure 2:
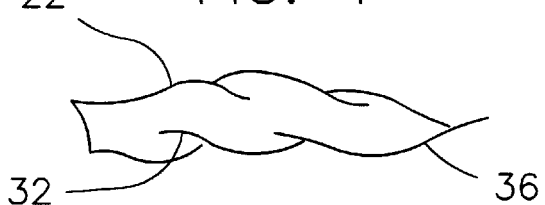
FIG. 2 shows an example of string-like nuggets as also found in the aggregate stock according to the present invention.
Figure 3:
FIG. 3 illustrates an example of banana-like nuggets comprised in the aggregate stock according to the present invention.
Figure 4:
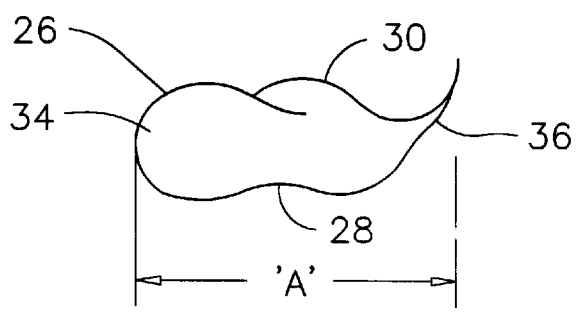
FIG. 4 is an example of oblong-shaped nuggets constituting a substantial portion of the aggregate stock according to the present invention. These nuggets are also referred to herein as tailed clumps.

While this invention is susceptible of embodiments in many different forms, there are shown in the drawings and will be described in details herein one specific embodiment of an aggregate stock containing paper nuggets of various sizes and shapes for use in the manufacturing of composite building materials, and machinery for manufacturing this aggregate stock, with the understanding that the present disclosure is to be considered as an example of the principles of the invention and is not intended to limit the invention to the embodiment illustrated.

Reference will firstly be made to FIGS. 1–4 illustrating various shapes of paper nuggets contained in the aggregate stock according to the preferred embodiment of the present invention.

The Aggregate Stock

The paper nuggets contained in the aggregate stock according to the preferred embodiment of the present invention are especially appropriate for manufacturing building blocks, bricks, panels, slabs, beams, columns and cast-in-place structures. These paper nuggets are made entirely of paper fibres and have shapes that promote interlocking there-between when mixed with cement or other binding agent and molded into usable objects. The products manufactured with the paper nuggets are lighter and more heat-insulating than the cement-impregnated composite materials. The products manufactured with the paper nuggets have excellent resistance to the elements and mechanical properties that are comparable to the cement-impregnated composite materials of the prior art.

The base material for manufacturing the paper nuggets comprises newsprint, corrugated paper boards, magazines and similar waste paper. When glossy magazine stock is used, however, it is preferable to use it with at least an equal proportion of newsprint or other waste paper containing a high content of wood fibres.

The paper nuggets contained in the aggregate stock according to the preferred embodiment are characterized in that a large portion of the nuggets produced by the process described hereinafter have interlocking shapes. It has been found that over 60% of the paper nuggets have the shape of either a tadpole 20, a string 22, a banana 24, or other similar oblong shapes or tailed clumps 26 having hollows 28 and lumps 30 thereon. These shapes are also characterized in that a great percentage thereof have a twisted core 32, a broad end 34 and a slender tail end 36. The twisted core keeps the paper fibres tightly packed together such as in a rope, and the lumps and hollows on the surface of the core act as knots on a rope for better interlocking adjacent nuggets together.

A typical sample of an aggregate stock according to the present invention contains nuggets with shapes according to the following classifications:

TABLE 1

| Types of Nuggets | Number of Nuggets | Ratio of Types |
| --- | --- | --- |
| Hollow Flakes | 6 | 1% |
| Pellets | 11 | 2% |
| Balls | 20 | 4% |
| Strings | 26 | 5% |
| Worms/Bananas | 37 | 8% |
| Tadpoles | 176 | 36% |
| Triangular | 28 | 6% |
| Flakes (not hollow) | 67 | 14% |
| Clumps with tails | 57 | 12% |
| Clumps without tails | 59 | 12% |
| Total | 487 | 100% |

It will be appreciated that all the nuggets having an elongated or tailed configuration promote interlacing therebetween. These are the nuggets having the shapes of either a string, a worm or banana, a tadpole or a tailed clump. These nuggets are found in the aggregate stock in a proportion of 61%.

Most nuggets in the aggregate stock are not flat. It was found that only 15% of the nuggets in the aggregate stock have relatively thin flake configurations. In other words, 85% of the nuggets in the aggregate stock have a thick mass to entrap air therein and to enhance the thermal resistance and lightweight properties of the product manufactured with the aggregate stock.

Furthermore, the nuggets in the aggregate stock have various shapes to better fill all the voids there-between when the nuggets are mixed with a binder and cast in a mold to form useful articles. In that respect, at least ten different shapes are found in the aggregate stock according to the preferred embodiment and a same shape does not represent more than 36% of the aggregate stock.

Referring back to FIG. 4, a major portion of the paper nuggets in the aggregate stock according to the preferred embodiment comprises nuggets having a major dimension 'A' of between ⅛ inch (3 mm) to about ¾ inch (19 mm). These variations in sizes and the various shapes of the paper nuggets as mentioned above, have been found to be advantageous for having good mold-filling properties and for forming an homogenous structure throughout the entire product manufactured with the aggregate stock.

Figure 5:
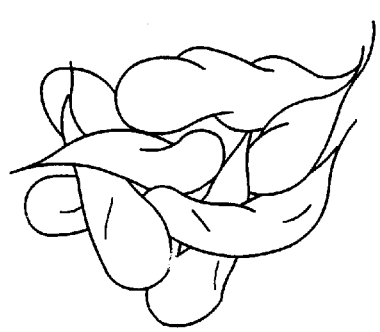
FIG. 5 is a nuggety structures of fibrous material showing typical interlacing of the tailed nuggets comprised in the aggregate stock according to the present invention.

When these paper nuggets are mixed in a slurry containing a binder, and cast in a mold, the concave and convex surfaces, the large and small ends of adjacent nuggets interlock with each other such as illustrated in FIG. 5, to form an interlaced nuggety structure of fibrous mass. The smaller nuggets fill the voids between the larger ones to reduce the amount of binder required in the product and to enhance the insulation and lightweight properties of the product. When cement is used as a binder, the cement covers each nugget to form a closed-cell matrix of hardened refractory binder around the nuggets, as will be explained later. The interlacing of the nuggets and the refractory binder matrix provide for building products that have remarkable tensile and compressive strengths and fireproofing properties.

Each individual paper nugget does not contain any binding agent other than lignin or other paper coating material present in the waste paper. Aside from the impurities found in waste paper, the paper nuggets contained in the aggregate stock according to the preferred embodiment contain 100% paper fibres. The process used for forming the nuggets ensures that the fibres are twisted and rolled up into cohesive entities that maintain their shapes when dried up, stored or manipulated.

The aggregate stock of paper nuggets according to the preferred embodiment is storable in heaps or in hoppers for later use in a molding process or can be packaged in bags or bulk bins for marketing to the public as aggregate material. An advantage of the aggregate stock according to the preferred embodiment is that even when the aggregate stock is stored in heaps or in bins for extended periods of time, such as one year or longer for example, under favourable conditions, the nuggets do not disintegrate or otherwise create excessive dust when the aggregate stock is subsequently manipulated.

Manufacturing Method and Apparatus

The paper nuggets in the aggregate stock according to the preferred embodiment are manufactured in three (3) broad steps, as illustrated in FIG. 6.

A) In a first step, the waste paper is introduced in a re-pulper 50, in bales or in loose form, and mixed with water. Mixing is carried out until a fluid homogeneous paper-water slurry is obtained.

B) The paper-water slurry is then pumped or otherwise conveyed to a dewatering station 52. Dewatering of the slurry is carried out using vacuum presses, screen presses, roll presses, evaporators or other equipment known in the art. Dewatering is carried out to obtain a wet mulch-like substance. The fibrous substance at this stage is preferably wet to, but not beyond the absorption saturation point of the paper fibres.

C) The paper-water mulch is then conveyed into a nugget-forming apparatus 54 where it is broken into paper nuggets according to the preferred shapes and sizes mentioned before. The nugget-forming apparatus comprises a trough with baffles and a plurality of rotors for swirling and penetrating the mulch, for extracting nuggets from the mulch and for conveying these nuggets along the trough.

Optional equipment may be added to the described installation to increase production or to vary product properties. These optional equipment comprise for example, a shredder 60 for breaking down paper bales into smaller fragments prior to feeding the waste paper into the re-pulper, and a beater 62 for breaking down the dewatered mulch prior to conveying the mulch into the nugget-forming apparatus 54.

Another optional step in the manufacture of paper nuggets comprises the drying of the paper nuggets when these nuggets are not used right away in a molding process. The degree of dryness may vary according with the intended use of the paper nuggets. For example, a 25% to 40% moisture content is preferred for paper nuggets that are stored or packaged for sale to the public. When the paper nuggets are used right away for molding construction elements for example, the moisture content of the nuggets may be as high as 100%.

The drying of the paper nuggets is carried out in a dryer 64 that can also vary in configuration from one installation to another. The drying of paper nuggets can be effected by forced ventilation, heat and tumbling or by natural evaporation and convection with the nuggets piled outside.

The process may also comprise screening apparatus (not shown) for sorting the paper nuggets by size, as required for specific applications.

Referring now to FIGS. 7 and 8, the nugget-forming apparatus 54 has a trough 70 and two rows of rotors 72,74 turning against one-another as indicated by arrows 76,78 and against a series of adjustable baffle plates 80,82, for promoting a pulling or extracting action in the moist paper mulch.

A gap 'B' between adjacent rotors is adjustable from about ⅛ inch (3 mm) to about ¾ inch (19 mm). The clearance 'C' between each rotor 72,74 and an adjacent baffle plate 80,82 is also adjustable between about ⅛ inch (3 mm) and ¾ inch (19 mm). In the preferred nugget-forming apparatus 54 there are two rows of rotors each containing five (5) rotors 72,74. Each rotor is made of a plurality of curved round rods 90. Each rotor has a spherical shape and a size to accommodate a required production capacity of the apparatus. It is believed that rotors having a diameter of about 6–8 inches (15–20 cm) for example are appropriate for use in an apparatus producing about 13 cubic yards (10 cubic meters) of paper nuggets per hour.

Each rotor is also movable in up and down direction relative to one-another for causing waves along the trough 70 and for better promoting a flow of paper mulch along the apparatus.

Each baffle plate 80,82 is adjustable relative to a respective rotor, by means of a linear actuator 84 for example.

The apparatus 54 may also comprise flow gates 86 that are adjustable toward and away from each other for defining an outlet opening of variable width 'D'. Similar flow gates, such as illustrated at 88, may also be installed at intermediate positions along the trough to regulate the flow of paper mulch between the rows of rotors. Hence, the size and flow of paper nuggets through the apparatus 54 are adjustable by varying the speed of the rotors 72,74, the gap 'B' between the rotors, the gaps 'C' between the baffle plates 80,82 and the rotors, and the width 'D' between the flow gates 86,88.

In use, the rotation of the rotors 72,74 causes the paper mulch to swirl around each rotor. The movement of the curved round rods 90 in each rotor further causes the moist paper mulch to separate into small fragments. The combined swirling of and penetration of the rotor into the wet mulch causes the fragments to twist upon themselves, thereby tightening the paper fibres therein, such as in the formation of a rope. The swirling action caused by downstream rotors causes the nuggets to further roll and twist upon themselves to firm up a cohesive shape.

The round cross-section of the curved round rods 90 causes the fragments to be pulled or extracted from the paper mulch, as opposed to cutting or shearing, to give each fragment a curved and oblong shape. The pulling force applied to each nugget causes the nugget to stretch and to further tighten the paper fibres together. The pulling on the nuggets also gives the nuggets a form that of ten resembles the shape of a tadpole 20. The combined twisting and pulling actions on the nuggets provide these nuggets with self-adherence such that they retain their shape, and contributes greatly to forming the aforesaid interlocking surfaces.

It has been found that two of the most important factors in the forming of the paper nuggets according to the preferred shapes are the retention time of the moist paper mulch inside the nugget-forming apparatus 54 and the moisture content of the moist paper mulch entering the apparatus 54. As mentioned before, the paper mulch entering the nugget-forming apparatus should be saturated with water but should not drip when manipulated lightly.

The retention time of the paper mulch inside the apparatus 54, the related opening 'D' between the flow gates 86,88 and the rotational speed of the rotors 72,74 are determined by visually monitoring the average nugget dimensions at the outlet end 92 of the trough. The oblong and twisted-core properties of the nuggets are determined primarily by the adjustment of the gaps 'B' and 'C'.

Another very important contributing factor for obtaining the preferred shapes of nuggets, is the use of rotors 72, 74, having round rods 90 and a spherical shape. It is believed that when the rotor rotates and is simultaneously raised and lowered, the curved round rods 90 apply friction or torque on the nuggets in a first direction 94 around the circumference of each rotor, in a second direction 96 across the diameter of each rod and in a third direction 98 along the arc define by each rod as illustrated by vectors in FIG. 9. The nuggets are extracted from the paper mulch by mere friction between the rounded surfaces of the rods 90 penetrating the paper mulch. Thus the nuggets are not cut out or sheared away from the paper mulch, but are rather pulled out in a complex twisting motion. This pulling and twisting effect is believed due to the configuration of the rotors 72, 74, and would probably not be possible using other equipment such as the square bars of a beater rotor, the blades of a paddle wheel or the flights of a screw conveyor for examples.

It will be appreciated that the method described above can be carried out by one or few persons using a single rotor and a portable container. It is also contemplated that this disclosure will encourage such use of simple equipment to recycle household paper waste into useful backyard composite products.

Product Manufactured with the Paper Nuggets

Figure 10:
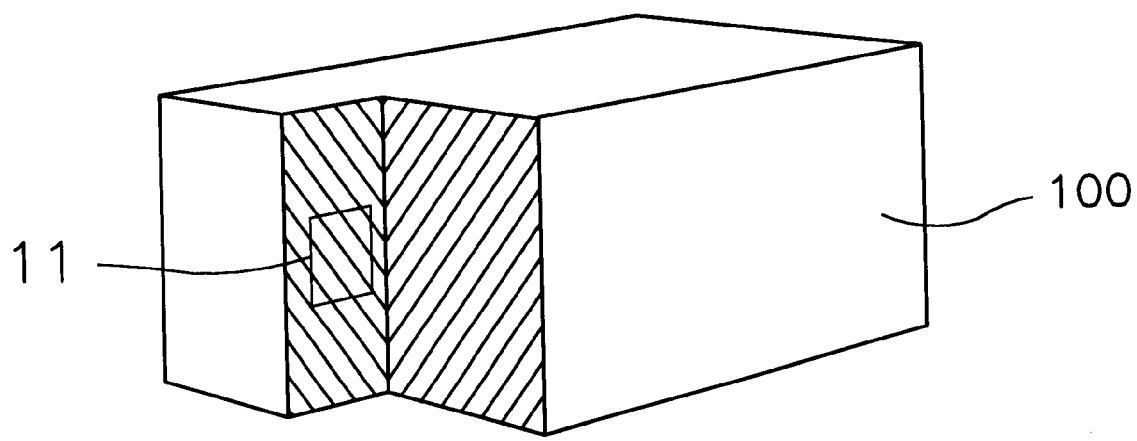
FIG. 10 is an example of a building block made with the aggregate stock according to the preferred embodiment of the present invention.
Figure 11:
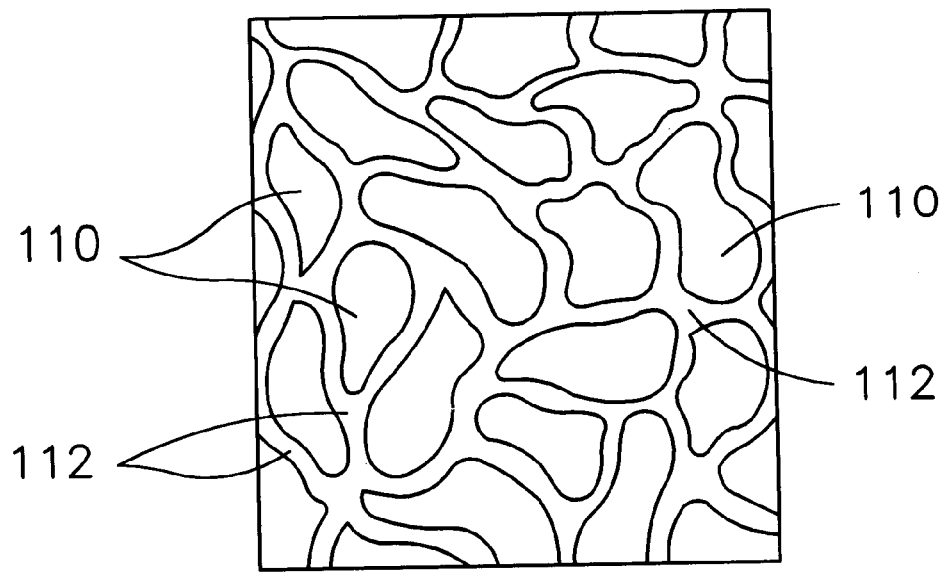
FIG. 11 is an illustration of the structure of the building block as seen in the reference square no. 11 in FIG. 10.

Referring now to FIGS. 10 and 11, there are illustrated therein a building block 100 made with the aggregate stock according to the preferred embodiment, and an enlarged view of the cellular structure in this block. As illustrated in the cross-section view of FIG. 11, the structure of the building block 100 contains paper nuggets 110 that are encapsulated into a matrix of hardened refractory binder 112.

The building block 100 referred to herein is only one example of the construction products that are manufacturable using the aggregate stock according to the preferred embodiment and a binding agent. The building block 100 is manufactured by firstly mixing the paper nuggets with a cement slurry for covering each nugget entirely. The coated nuggets are then compressed into a mold and dried. A degree of compression of the nuggets into the mold determines the density of the block, its surface uniformity, and to a certain extent, its structural strength.

While the block is said to be manufactured using a cement slurry, it will be appreciated that other binding agents can also be used. For examples, the composite product can be manufactured with paper nuggets and lime, mortar and resins such as latex, vinyl, polyester, acrylic or epoxy.

Upon hardening, the binding agent forms a solid matrix of closed cells encapsulating each paper nugget and retaining the paper nuggets into the compressed state at which the product was molded. The wall 112 of each cell has a thickness which is also determined to some extent, by the degree of compression at which the product was molded. The binding agent impregnates the surface of each nugget without seeping throughout the nugget.

Although thorough scientific testings of building materials made with an aggregate stock according to the preferred embodiment are not yet completed, it is believed that a composite product having a paper fibre content of up to 95% is achievable using an aggregate stock according to the preferred embodiment. The total weight of a molded structure containing the paper nuggets is similar to the weight of wood. The heat and sound-insulating properties of the described composite material are believed to be better than the cement-impregnated structures of the prior art.

The composite product manufactured with the paper nuggets has substantial resiliency and does not appear to expand or contract when in contact with cold or warm temperature, or when being simultaneously exposed to cold temperature on one side thereof and warm temperature on the other side.

The composite products manufactured with the aggregate stock according to the preferred embodiments also have buoyancy and resistance to the elements. Because of the closed-cell structure and the paper fibre and air content of each cell, the products float on water. The products do not seem to be affected by frost. Each cell contains packed paper fibres and air, and therefor it is believed that these cells do not easily admit water. It is believed that the products can be submersed or left outside during winter without being damaged by repeat frost and thaw. It is further believed that the building blocks thus formed can be used with mortar for building above-grade exterior and interior walls in a manner that is similar to the use of common masonry blocks.

The products manufactured with the aggregate stock according to the preferred embodiments have shown a remarkable resistance to shock in that they do not crumble like concrete. A localized blow for example, causes a localize deformation without affecting the properties of the surrounding structure. Therefore, the products manufactured with an aggregate stock according to the preferred embodiment are believed to be appropriate for use in areas susceptible of earthquakes.

Further, the composite products are self-extinguishing when manufactured with Portland cement for example, for having a closed-cell structure wherein the fibrous matter is encapsulated in a cement matrix.

While one embodiment of an aggregate stock of paper nuggets, of a method and apparatus for manufacturing this aggregate stock have been described hereinabove and illustrated in the accompanying drawings, it will be evident to those skilled in the art that changes and modifications may be made therein without departing from the essence of this invention, as set forth in the appended claims.

We claim:

1. A method for manufacturing paper nuggets for use in the manufacturing of composite building materials, said method comprising the steps of:

repulping waste paper into a waste paper slurry;

dewatering said waste paper slurry for forming a wet mulch of waste paper in which a water content is substantially equivalent to a water absorption saturation point of paper fibres in said wet mulch, and simultaneously swirling said wet mulch, extracting fragments from said wet mulch and rolling said fragments against said wet mulch;

such that a substantial portion of said fragments have a twisted core and an oblong shape with a broad end and slender tail end.

2. The method as claimed in claim 1, wherein said step of simultaneously swirling said wet mulch, extracting fragments from said wet mulch and rolling said fragments against said wet mulch, is effected by penetrating said wet mulch with a first spherical rotor having curved round rods.

3. The method as claimed in claim 2, further comprising the step of moving said wet mulch between said first spherical rotor and a baffle.

4. The method as claimed in claim 3, further comprising the step of moving said wet mulch between said first spherical rotor and a second spherical rotor spaced-apart from said first spherical rotor.

5. The method as claimed in claim 2, further comprising the step of simultaneously rotating said first spherical rotor in said wet mulch and moving said first spherical rotor along a rotational axis thereof.

6. The method as claimed in claim 1, further comprising the step of drying said fragments to a moisture content of between 25% and 40%.

* * * * *